April 19, 1938.  W. C. McBAIN  2,114,603
APPARATUS FOR REGULATING
Filed Oct. 18, 1935   2 Sheets-Sheet 1

INVENTOR
William C. McBain
by his attorneys
Stebbins, Blenko & Parmelee

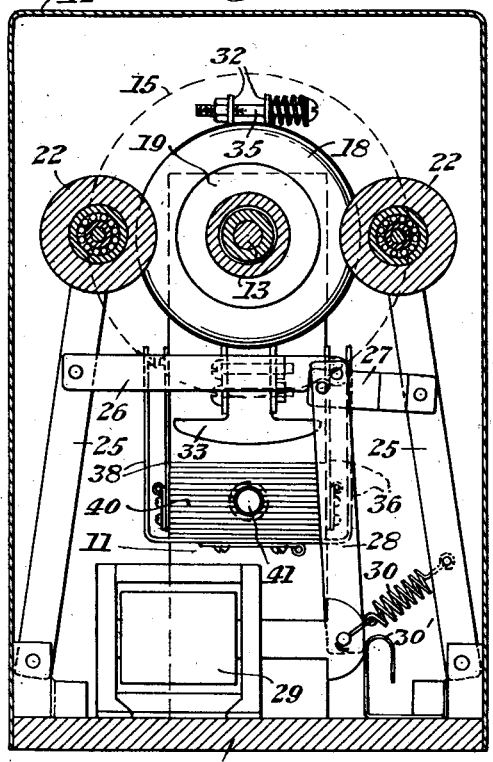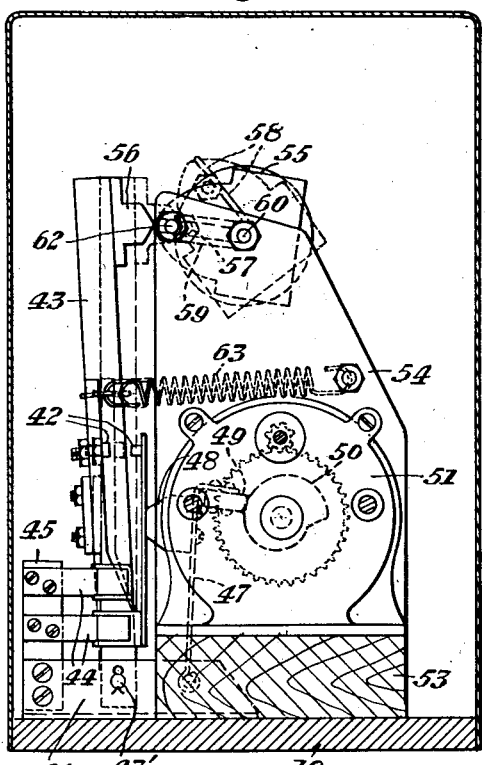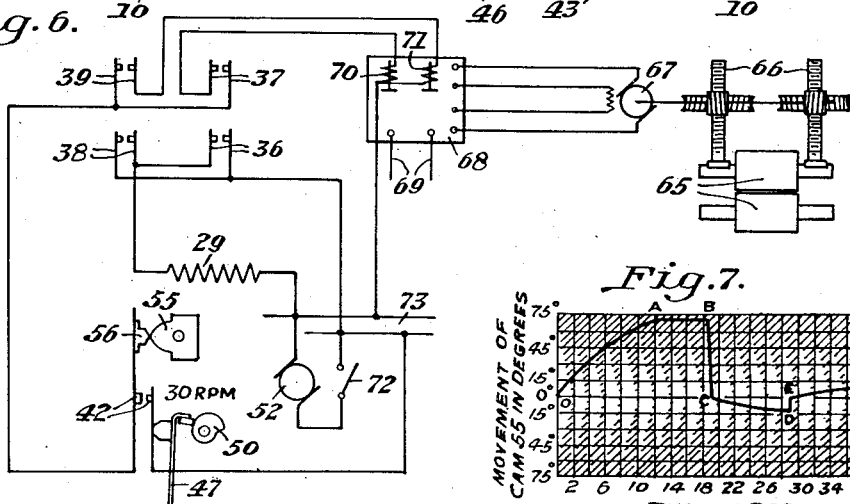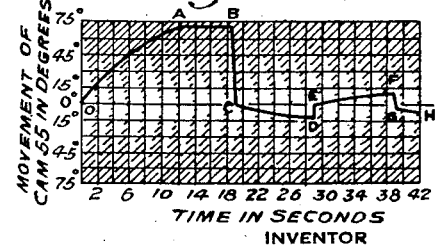

Patented Apr. 19, 1938

2,114,603

UNITED STATES PATENT OFFICE 2,114,603

APPARATUS FOR REGULATING

William C. McBain, Youngstown, Ohio

Application October 18, 1935, Serial No. 45,635

10 Claims. (Cl. 172—239)

This invention relates to regulating and, in particular, to a method and apparatus for maintaining a function constant by applying necessary corrections upon deviations thereof from a predetermined value. A specific application of the invention in connection with which it will be disclosed, is the maintenance of a constant gauge of strip being rolled in a rolling mill. The invention may be otherwise applied, however, and the regulation of a rolling mill to produce constant gauge strip is disclosed merely by way of example.

It is highly desirable, in view of the increasing rigidity of the requirements of users of sheet steel, to produce strip of constant gauge. This result has been approached heretofore by manual control of the motor operating the mill screwdowns, but, however, because of the human factor involved, perfection has not been realized. I have invented a method and apparatus for automatically applying a corrective adjustment to a function which it is desired to maintain constant on departure thereof from the given standard. In accordance with my invention, I measure the function to be controlled and apply corrective adjustments in accordance therewith. These adjustments are not applied continuously, but for short intervals only, the length of the intervals being dependent on the departure of the function from the desired standard. In other words, a wide variation in the function will cause the corrective adjustment to be applied for longer intervals than a small variation. The corrective adjustment is applied electrically by the operation of control contacts operated by mechanism actuated in accordance with the function being measured, the specific example to be disclosed herein being the gauge of strip. The corrective adjustment is intermittently terminated by a stop contact, which is operated periodically. The portion of the period of operation of the stop contact during which it is effective to terminate the corrective adjustment, depends upon the extent of movement of the gauge measuring mechanism.

A complete understanding of the invention may be obtained by a consideration of the following detailed description thereof, and the accompanying drawings illustrating the present preferred embodiment. It will be understood, however, that the invention may be embodied otherwise than as shown, within the scope of my broader claims. In the drawings—

Figure 4 is a transverse sectional view along the line IV—IV of Figure 1;

Figure 5 is an end elevation with parts in section along the line V—V of Figure 1;

Figure 6 is a schematic diagram; and

Figure 7 is an explanatory chart.

Figure 1:
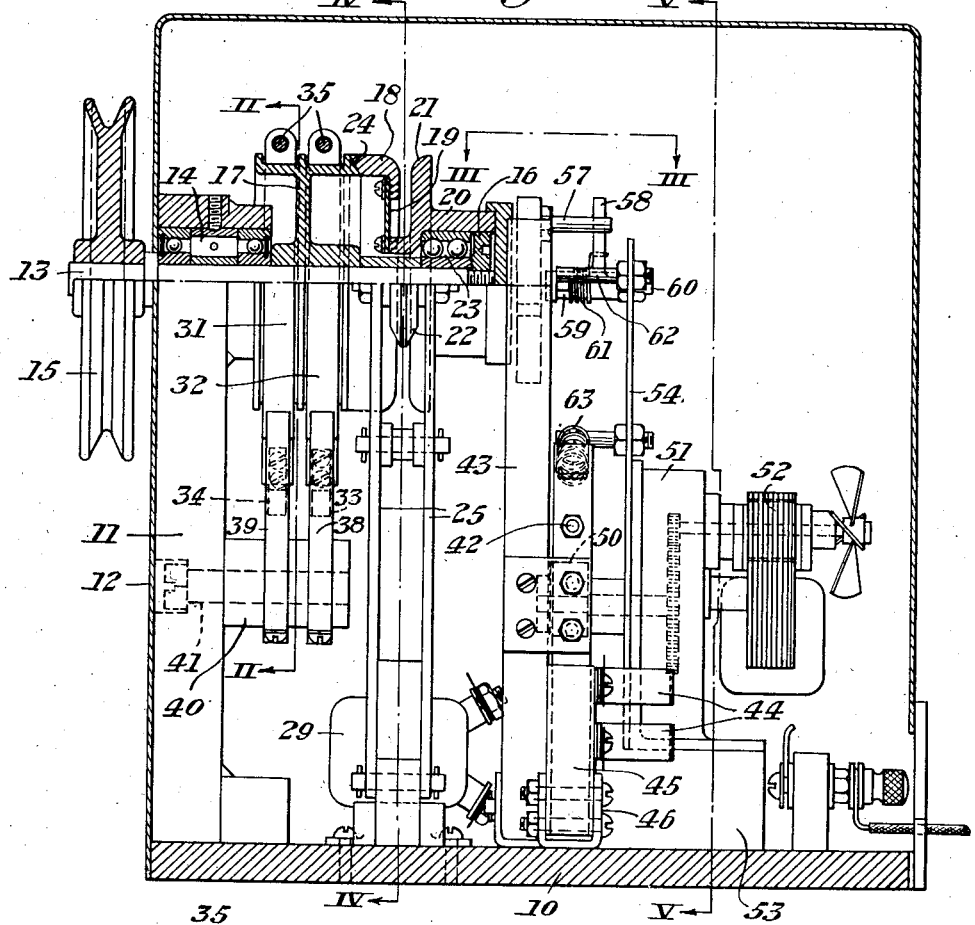
Figure 1 is a longitudinal sectional view (with parts in elevation) taken through the apparatus.

Referring in detail to the drawings, the apparatus comprises a base 10 having a bearing post 11 mounted thereon. A cover 12 is adapted to fit down over the post 11 and the other elements to be described later. A shaft 13 is journaled in a bearing 14 seated in the upper end of the post 11, and extends outwardly of the cover 12 through a suitable opening therein. An actuating pulley 15 is secured to the outer end of the shaft 13 and is adapted to be actuated by mechanism responsive to the function to be controlled. In the application of the invention to the control of the gauge of strip being rolled in a rolling mill, the pulley 15 is preferably connected to a continuous strip gauger such as that disclosed and claimed in Steckel et al. Patent No. 1,968,790, or that disclosed and claimed in the copending application of Howard S. Lamb, Serial No. 690,995 for Automatic regulator. Any other type of gauger may be employed which is adapted to actuate the shaft 13 in one direction or the other, depending upon the variation in the gauge of strip from a predetermined value, through such means as the pulley 15 and a belt connection.

The inner end of the shaft 13 is threaded to receive a nut 16. A clutch comprising a drum 17 and a ring 18 is disposed on the shaft between the nut 16 and bearing 14, the drum being rigidly secured to the shaft by the nut. The ring 18 is connected by a flexible disk 19 to a barrel 20 having a flange 21. The adjacent faces of the ring 18 and the flange 21 are rounded for cooperation with the tapering edges of wedging rollers 22. The barrel 20 and with it the ring 18, is rotatable on the shaft by means of a combination radial and thrust bearing 23. When the wedging rollers are operated to force the ring 18 into engagement with the drum 17, the barrel 20 rotates with the drum, the cooperating friction surfaces of the ring and drum being shown at 24. When frictional engagement of these faces is released, the barrel 20 is free to turn on the shaft and the ring 18 with it.

The wedging rollers 22 are journaled on links 25 pivoted to the base 10. A contractile linkage including links 26, 27 and 28 are provided for causing the rollers 22 to force the ring 18 relatively to the flange 21 of the barrel 20. It will be apparent from Figure 4, that clockwise rotation of the lower end of link 28 will tension the links 26 and 27, and draw the wedging rollers 22 together, thus producing the described operation of the ring 18. This movement of the link 28 is obtained by means of a solenoid 29, the core of which is pivoted to the link. A retracting spring 30 normally withdraws the core against a stop 30' and thus releases the wedging action of the rollers 22 on the clutch ring.

The drum 17 is provided with a pair of friction collars 31 and 32. These collars carry contact operating shoes 33 and 34 and are provided with friction adjusting screws 35. Rotation of the shaft 13 causes the shoes 33 and 34 to move angularly and cause engagement of contacts 36 and 37 or 38 and 39, depending on the direction of shaft rotation. The contacts 37 and 39 control the operation of the mill screwdown motor by means of auxiliary control equipment which will be described later. The contacts 36 and 38 control the energization of the solenoid 29. All the contacts are mounted on an insulating block 40 secured to the post 11 by a screw 41.

The operation of the screwdown motor is controlled not only by contacts 37 and 39, but also by contacts 42 mounted on a lever 43 pivoted to the base 10 at 43'. Connections to the contacts 42 include sliding contacts 44 mounted on an insulating post 45. The post 45 is secured to a channel bracket 46 to which the lever 43 is pivoted.

The contacts 42 are adapted to be closed by a finger 47 pivoted to the bracket 46. A block 48 on the finger cooperates with one of the contacts 42, while a block 49 thereon serves as a follower for a contact operating cam 50. The cam 50 is secured to the slow speed shaft of a reducing gear 51, the high speed shaft of which is driven by a motor 52. The reducer 51 is mounted on a block 53 on the base 10, and carries a vertical plate 54.

A cam 55 is secured to the barrel 20 and cooperates with a follower 56 at the upper end of the lever 43. The cam has a pin 57 extending parallel to the shaft 13 for cooperation with a centering device including arms 58 and 59 pivoted on a pin 60 on the plate 54, and a coil spring 61. The spring normally urges both arms 58 and 59 against a stop pin 62 on the plate 54. The arms cooperating with the pin 57 thus tend to center the cam, but permit the latter to rotate to a limited extent in either direction from the neutral position. The lever 43 is urged in a clockwise direction by a spring 63 so that the follower 56 engages the cam 55 at all times.

Figure 6 illustrates the control system by which the apparatus shown in Figures 1 through 5 operates to perform its intended function. In Figure 6, a rolling mill is illustrated diagrammatically at 65, and the screwdowns thereof at 66. A reversing screwdown motor 67 is connected to a control panel 68 supplied with power from any suitable source indicated by the conductors 69. Of the control equipment necessary for operating the motor 67, I have shown only a pair of relays 70 and 71. These relays are adapted to initiate the operation of known automatic control equipment to start the motor 67 in one direction or the other. As shown in Figure 6, the relays 70 and 71 are controlled by the contacts 37 and 39. Having described the apparatus of my invention, I shall now review briefly the operation thereof.

Figure 2:
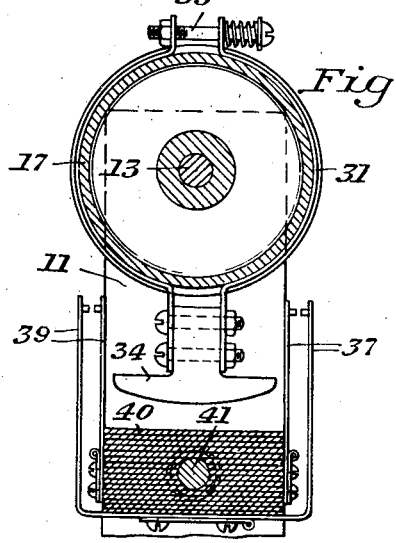
Figure 2 is a partial sectional view along the line II—II of Figure 1.
Figure 3:
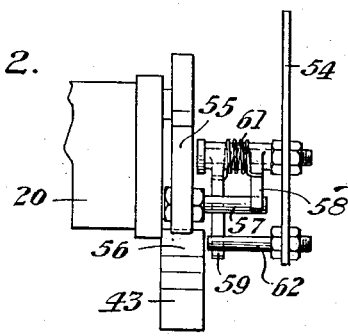
Figure 3 is a partial plan view as indicated by the line III—III of Figure 1.

The shoes 33 and the cam 55 normally occupy the positions shown in Figures 2 and 5. The contacts 36 through 39 therefore remain open. The motor 52 is normally energized by the closure of a switch 72, being thereby connected to a supply circuit 73. The cam 50 thus runs continuously and periodically closes the contacts 42. The length of the periodic time intervals that the contacts 42 remain closed is a variable depending upon whether the cam 55 is in its normal position with the shoe 56 against its apex or has rotated in either direction from its normal position. The cam 50 is preferably driven at a speed of about 30 R. P. M. So long as the contacts 36 to 39 are opened, closure of the contacts 42 has no effect.

The gaugers described in the patent and application above mentioned are well adapted to actuate the pulley 15 upon the occurrence of a departure of the gauge of the material being rolled from a predetermined value. The pulley will be rotated one way or the other, depending on whether the departure from the proper gauge is plus or minus. If it is assumed that the material issuing from the mill 65 exceeds the desired gauge, the shaft 13 will be rotated, for example, in a clockwise direction as viewed in Figure 2. Because of the frictional engagement of the collars 31 and 32 with the clutch drum 17 which is secured to the shaft 13, the shoes 33 and 34 close contacts 38 and 39. The closure of contact 38 energizes the solenoid 29. This contracts the linkage 26, 27 and causes the clutch ring 18 to engage the drum 17 and move therewith. The extent of movement of the shaft, and therefore, the ring 18 and barrel 20, is dependent upon the magnitude of the departure of the strip gauge from the desired value, and will continue until the gauge is reduced to the proper point.

The closure of the contact 39 prepares a circuit for the relay 70 which causes operation of the motor 67 to advance the screw 66 and decrease the gauge of the material being rolled. This circuit is only completed, however, during the time when the contacts 42 are closed. These contacts are closed only during a portion of each rotation of the cam 50.

Rotation of the cam 55 to some such position as shown in dotted lines in Figure 5 permits the contacts 42 to remain closed for a longer period than when the cam is in the position shown in solid lines in Figure 5. It will be apparent from Figure 5 that the portion of each revolution of the cam 50 during which the contacts 42 are closed depends upon the position of the left hand contact relative to the cam shaft. The cam 55 is shaped so that rotation thereof will cause the lever 43 to move to the right as shown in dotted lines in Figure 5, under the action of spring 63, to an extent proportional to the angular rotation of the cam.

The circuit for the relay 70 is interrupted for a certain portion of each revolution of the cam 50 and the operation of the screwdown motor 67 is therefore intermittent. The portion of each revolution of cam 50 during which the motor 67 actually operates, however, depends upon the amount of screwdown adjustment required to correct the gauge of the material.

When the proper gauge of material has been restored, rotation of the shaft 13 stops. Upon the slightest reversal of rotation, however, the contacts 37 and 39 will be opened. Further adjustment of the screwdowns ceases and the clutch solenoid 29 is deenergized. The cam 55 is therefore reset to its normal position by the centering spring 61.

If the gauge of the strip should be less than the desired value, the shaft 13 will rotate in the counterclockwise direction with the same results as above described, except that relay 71 will be energized by the closure of the contact 37, and the screwdown motor operated to raise the screw 66. The contact 36 is in parallel with the contact 38 and energizes the clutch solenoid 29 in the same manner as already described. The frictional engagement between collars 31 and 32 and the drum 17 is adjusted so as to permit continued rotation of the latter, even though the former are restrained by the contacts after a limited angular movement. As soon as the required corrective adjustment of the mill screws has been made, the cam 55 returns to normal position as described. When further adjustment is required, regardless of the direction, it will proceed at the minimum rate until the cam has been shifted from neutral position in one direction or the other. This operation of the cam, of course, causes the correcting adjustment to proceed at a rate proportional to the difference between the desired gauge and the gauge actually being rolled, as shown graphically in Figure 7.

Figure 7 shows a typical performance curve of my automatic regulator. Vertically is plotted the deviation in degrees of the cam 55 from its zero or normal position. Clockwise movements are plotted above the zero line and counterclockwise movements below the zero line. Time elapsed in seconds is plotted horizontally. Shaded portions of the chart show when circuits are closed so as to cause screwdown motor operation. Unshaded areas show when circuits are open so that screwdown motor is at rest. The curve OABCDEFGH is the typical performance curve. Where this curve passes through shaded areas the screwdown motor is in operation and where it passes through white areas this motor is at rest. It is assumed that the shaded portions above the zero line represent movement of my regulator to cause screwdown motor to drive the rolls closer together while the shaded portions below the zero line represent movement of said regulator to cause screwdown motor to separate the rolls. It is also assumed that when starting the pass, the rolls are set too far apart. Cam 55 then revolves rapidly clockwise to its extreme travel of about 70°. At this point the shoulder on said cam prevents further movement. In fact, further rotation of this cam is unnecessary (as can be noted from the chart) as the extreme rotation of the cam in either direction, until stopped by one of its shoulders against the follower 56, causes a continuous operation of the screwdown motor and further rotation of the drive shaft 13 in the same direction slips the clutch surfaces 24 without interfering with the continuous operation of the screwdown motor, until the gauge correction has been completed, as at B, when the clutch is released and the cam 55 returns to zero or normal position. The first correction in each pass, such as that shown on the curve as OABC, is generally a large correction. After the regulator has once set the screwdown to the correct gauge, as at C, the subsequent corrections are generally small as shown at CDEFG. It will be seen that the regulator acts equally well to correct for under-thickness strip as it will for over-thickness strip. The chart shows very clearly the quick return to zero or normal position of the cam after each correction has been completed at C, E and G. This feature is of great value in preventing hunting and constitutes one of the valuable features of my invention.

A study of this chart shows that my regulator is capable of producing a continuous adjustment of the screwdown when the deviation from normal gauge requires considerable correction. It will also be seen that it provides only short periodic adjustments when the deviation from normal gauge is slight. In other words, my regulator is equally efficient for correcting small deviations or large deviations from normal-gauge strip. This also constitutes a valuable feature of my invention.

An outstanding advantage of the structure described is that it limits the tendency inherent in almost all regulators to overshoot or hunt. Corrective adjustment is made at a rate corresponding to the departure from the desired condition, and the correction is stopped the instant the gauge thickness passes through its correct value. This is accomplished by the fact that a very minute reversal of the drive pulley 15 disengages the clutch surfaces 24 and allows the cam 55 to return to its normal or zero position. In this way, accurate control of the strip gauge is obtained at all times, and the product is substantially uniform in gauge throughout its length. The errors and excesses resulting from hand regulation or that provided by prior automatic devices are avoided by my invention because the rate of applying the correcting adjustment is always proportional to the total amount of correction necessary.

Although I have illustrated and described herein but one preferred form and practice of the invention, it will be apparent that changes in the apparatus and method described may be made without departing from the spirit of the invention or the scope of the appended claims.

I claim:

1. A regulator comprising a shaft, contacts adapted to be operated thereby on rotation of the shaft for controlling a correction applying means, a stop contact for rendering said means ineffective, means for periodically operating the stop contact, and a cam on said shaft for varying the proportion of a given time in which the stop contact is closed.

2. A regulator comprising a shaft, contacts adapted to be operated thereby on rotation of the shaft for controlling a correction applying means, a stop contact for rendering said means ineffective, means for periodically operating the stop contact, a cam on said shaft for varying the proportion of a given time in which the stop contact is closed, and a clutch adapted to connect the cam to the shaft for rotation therewith.

3. A regulator comprising a shaft, contacts adapted to be operated thereby on rotation of the shaft for controlling a correction applying means, a stop contact for rendering said means ineffective, means for periodically operating the stop contact, a cam on said shaft for varying the proportion of a given time in which the stop contact is closed, a clutch adapted to connect the cam to the shaft for rotation therewith, and means for operating said clutch only when said shaft is moved from a predetermined position.

4. A regulator comprising a shaft, contacts adapted to be operated thereby on rotation of the shaft for controlling a correction applying means, a stop contact in series with said contacts, means for periodically operating the stop contact, a cam on said shaft for varying the proportion of a given time in which the stop contact is closed, a clutch adapted to connect the cam to the shaft for rotation therewith, a solenoid for operating said clutch, and contacts actuated on rotation of the shaft in either direction for energizing said solenoid.

5. A regulator comprising a shaft, contacts adapted to be operated thereby on rotation of the shaft for controlling a correction applying means, a stop contact in series with said contacts, means for periodically operating the stop contact, a cam on said shaft for varying the proportion of a given time in which the stop contact is closed, and means for restoring said cam to a predetermined position when said clutch is disengaged.

6. A regulator comprising a shaft, control contacts and clutch contacts adjacent the shaft, means on the shaft for operating the contacts on rotation of the shaft, a cam free on the shaft, a clutch controlled by said clutch contacts for gripping the cam to the shaft, said control contacts normally being effective when operated to cause an adjusting operation, a stop contact for rendering said control contacts ineffective, and means for periodically operating said stop contact, said cam being effective to vary the time during which the stop contact remains operated.

7. Apparatus for regulating a variable function, comprising a shaft adapted to be rotated in accordance with variations in the function to be regulated, contacts adapted to be operated on rotation of the shaft for causing a correction of said function, means for periodically interrupting said correction, and means operable by said shaft to vary the length of said interruptions in inverse proportion to said variations in said function.

8. Apparatus for regulating a variable function, comprising a shaft adapted to be rotated in one direction or another by means responsive to said function, contacts adapted to be operated by said shaft for causing a correction in said function, an interrupting contact for intermittently stopping the correction, and means actuated by said shaft for varying the lengths of such stoppages.

9. Regulating apparatus comprising a member adapted to be actuated in accordance with a function being regulated, contacts controlled by said member for effecting a corrective adjustment, additional contacts effective to discontinue said adjustment, means for actuating said last-mentioned contacts periodically, and means actuated by said member for controlling the length of the periods of actuation of said last-mentioned contacts.

10. Apparatus for regulating a variable function, comprising a motor for applying a corrective adjustment when the function varies, means responsive to said function for starting said motor, means for periodically stopping said motor, means for varying the length of the stoppage in accordance with the magnitude of the variations of said function, and means for resetting said last-mentioned means to the position of maximum length stoppages when the required correction has been made.

WILLIAM C. McBAIN.